Figure 1:
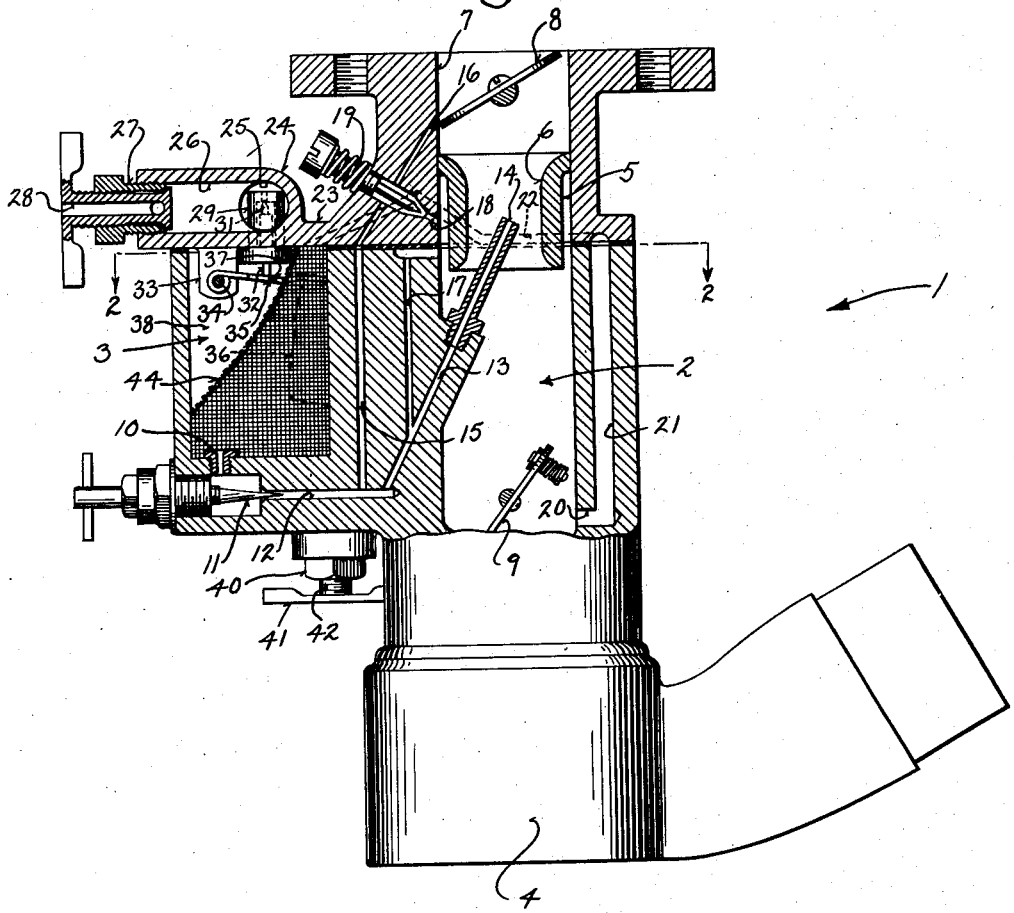

Nov. 11, 1958 — H. C. STEARNS — 2,859,874
CARBURETOR FLOAT CHAMBER SCREEN AND SEDIMENT TRAP
Filed June 11, 1954 — 2 Sheets-Sheet 1

INVENTOR
Harry C. Stearns

BY
Arthur H. Seidel
ATTORNEY

Nov. 11, 1958 H. C. STEARNS 2,859,874
CARBURETOR FLOAT CHAMBER SCREEN AND SEDIMENT TRAP
Filed June 11, 1954 2 Sheets-Sheet 2
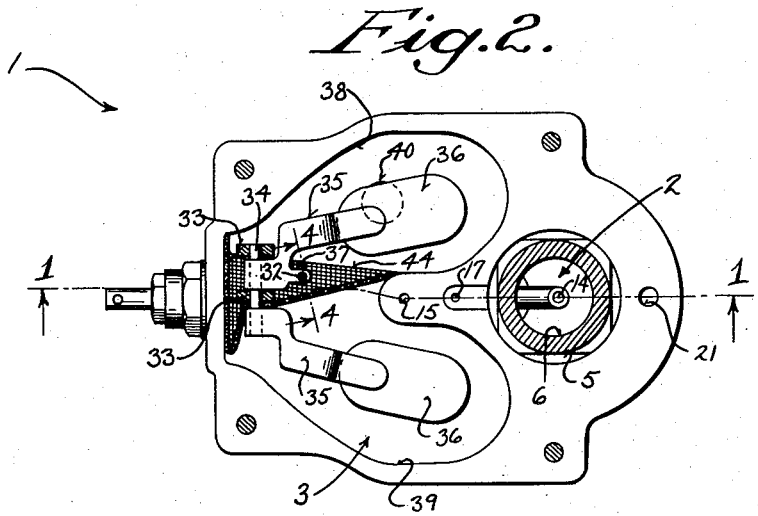
INVENTOR
Harry C. Stearns
BY
Arthur H. Seidel
ATTORNEY

United States Patent Office 2,859,874
Patented Nov. 11, 1958

2,859,874

CARBURETOR FLOAT CHAMBER SCREEN AND SEDIMENT TRAP

Harry C. Stearns, Glen Ellyn, Ill.

Application June 11, 1954, Serial No. 436,010

3 Claims. (Cl. 210—106)

This invention relates to fuel filtering apparatus for use with a carburetor and it more specifically resides in a sediment trap having a chamber separated by a filter screen into a sediment collecting compartment and a filtered fuel compartment, wherein the fuel introduced into the chamber enters the sediment collecting compartment and washes against the screen with a cleansing action to clear an area of the screen to ensure that fuel may pass through the screen, while the solid matter in the fuel is retained in the sediment collecting compartment.

It has been a common practice to filter the fuel for a gasoline engine by passing it through a sediment trap enroute from the fuel tank to the carburetor. Such a trap usually includes a bowl, in which sediment may settle, a fuel inlet and a fuel outlet separated from the inlet by a filter screen. The fuel passes through the screen and particles of matter are captured by the screen, where they collect and in time close the screen openings. Where an engine is employed in a dusty, particle laden air, the screen of a sediment trap may quickly become fouled, necessitating removal and cleaning at frequent intervals. On a farm tractor such cleaning must often be carried out by the operator, causing excessive loss of time, particularly when the operator must make repair in the field without the benefit of either proper tools or replacement gaskets and screens. Often, the frequent cleaning required causes a distaste on the part of the operator that prompts him to derange the sediment trap for circumventing the filtering action. Particles in the fuel are then admitted to the carburetor, where a more serious fouling of passages and jets may occur.

In the present invention a filter screen is continually washed by a turbulent action of the fuel to positively clear a portion of the screen from sediment particles. The particles are induced to settle to the bottom of the trap from where they may be readily removed. The necessity of replacement of the screen is eliminated and the resulting quick and easy removal of collected sediment reduces maintenance time.

It is an object of this invention to reduce the maintenance required for the fuel filtering apparatus employed with a gasoline engine.

It is another object of this invention to provide a permanent filter screen that will have an area kept clear of solid matter for unrestricted passage of fuel from one side to the other.

It is another object of this invention to provide a fuel filtering system that may be directly incorporated within the float chamber of a carburetor, with the elimination of a sediment collecting bowl separate from the carburetor housing.

It is another object of this invention to provide a sediment collecting trap as a part of a carburetor that may be easily and readily cleaned without dismantling of the carburetor.

It is another object of this invention to provide a filter screen for a fuel sediment trap that is disposed in the path of flowing fuel to be washed and cleansed free of collecting sediment.

These and other objects and advantages of this invention will appear in the description to follow. In the description reference is made to the accompanying drawings, which form a part hereof, and in which there is shown by way of illustration and not of limitation a specific form in which this invention may be embodied.

Figure 4:
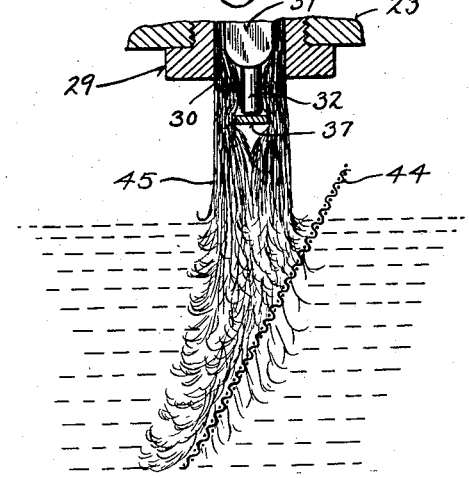

In the drawings:

Fig. 1 is a side view in elevation with parts broken away and in section of a carburetor in which this invention is embodied, Fig. 2 is a top plan view of the carburetor shown in Fig. 1 viewed through the plane 2—2, to disclose the interior of the float chamber and the main air passage, Fig. 3 is a rear view in elevation of the carburetor with parts broken away and in section to expose the interior of the float chamber, and Fig. 4 is a fragmentary enlarged view in elevation of a portion of the interior of the float chamber of the carburetor, showing the flow of fuel from the inlet orifice washing against the filter screen within the chamber.

The carburetor 1 shown in the drawings is of the up draft type, and is comprised primarily of a main air passage 2 and a float chamber 3. An air intake 4 connects to the lower terminus of the main air passage 2, and a passage restricting insert 5 within the passage 2 provides a venturi throat 6 dividing the lower section from an upper portion 7. A throttle butterfly 8 is disposed in the portion 7 and a choke butterfly 9 is disposed near the bottom of the main air passage 2.

The float chamber 3 is provided with a fuel outlet orifice 10 that leads to an adjustable needle valve 11 and hence to a jet supply passage 12. The jet supply passage 12 branches into a main jet passage 13 terminating in a main jet 14 in the venturi throat 6, and into an idle jet passage 15 that terminates in an idle jet 16 opening upon the upper portion 7 of the main air passage 2. An air bleed passage 17 opens at one end upon the main air passage 2 at a point beside the passage restricting insert 5, and leads into the main jet passage 13. A second air bleed passage 18, also opening upon the main air passage 2 at a point to the side of the passage restricting insert 5, leads to the idle jet passage 15. An adjustable needle valve 19 is provided to control the rate of flow of air passing through the passage 18, thus giving a control of the fuel mixture leaving the idle jet 16.

To equalize the pressures within the float chamber 3 and in the intake end of the main air passage 2, an air duct is provided that extends from the passage 2 to within the chamber 3. This duct comprises an inlet port 20 in the side wall of the main air passage 2, that leads into a duct 21 extending upwardly to a juncture with a duct 22 that leads into the float chamber 3.

A removable cover 23, that includes the upper portion 7 of the main air passage 2, is provided for the float chamber 3. The cover 23 is formed with a horizontal cylindrical portion 24 that has a bore 25 providing a fuel inlet for the carburetor 1. A short passage 26 leads off from the bore 25 to receive a valve 27. The valve 27 is normally closed, as shown in Fig. 1, but may be opened to drain fuel through the opening 28, to provide a check as to whether fuel is available to the carburetor 1 at this point.

A fuel inlet valve housing 29 is seated in the cover 23 and extends into the bore 25. The valve housing 29 presents an orifice 30 opening upon the interior of the float chamber 3, as is shown in Fig. 4, so that fuel may pass from the bore 25 through the housing 29 into the float chamber 3. Disposed within the housing 29 is a needle valve 31 having a vertical stroke and presenting a downwardly extending valve stem 32, as is also shown in Fig. 4. When the valve stem 32 is moved upwardly the valve 31 closes an opening in the housing 29, to restrict the passage of fuel into the float chamber 3. When the valve stem 32 is permitted to descend the valve 31 moves to an open position whereby fuel may flow into the float chamber 3.

On the underside of the cover 23 are a pair of depending mounting ears 33, that extend into the float chamber 3 and support a horizontal pivot pin 34. Attached to the pivot pin 34 are a pair of arms 35, the configuration of which is shown in Figs. 1 and 2. Attached to the deflectable ends of the arms 35 are a pair of hollow floats 36. The floats 36 will rise and fall in response to changes in level of the fuel within the chamber 3, and thus cause a pivot of the arms 35 about the pin 34. As is shown in Fig. 2, one arm 35 has a small protruding ear 37 extending to beneath the orifice 30 of the valve housing 29. The ear 37 supports the valve 31 by engaging the bottom of the valve stem 32. In this manner the opening and closing of the valve 31 is dependent upon float position and hence the level of fuel within the chamber 3.

As is clearly shown in Figs. 2 and 3, the float chamber 3 is comprised of a pair of cavities, one of which is a sediment trap compartment 38, and the other being a filtered fuel compartment 39. The sediment compartment 38 has a greater depth than the filtered fuel compartment 39 and a clean out valve 40 is provided in the floor of the sediment compartment 38 for the purpose of draining the float chamber 3. The valve 40 is shown in closed position, but may be opened by turning finger wings 41 to turn the threaded valve shank 42 inwardly, so that a bore 43 in the shank 42 is projected into the compartment 38. Fuel and sediment may then be drained through the bore 43, for cleaning the interior.

Dividing the float chamber 3 into the compartments 38, 39 is a filter screen 44, that rises upwardly from the floor of the chamber 3 and extends between opposite side walls. For fuel to pass from one of the compartments 38, 39 to the other, it must pass through the screen 44. A major portion of the screen 44 extends obliquely upwardly with an area of the slanting surface directly beneath the orifice 30 in the valve housing 29. The position of the screen 44 places the orifice 30 upon the side of the sediment trap compartment 38, and for fuel to reach the filtered fuel compartment 39 it must consequently pass through the filter screen 44. The mesh of the screen 44 is selected to prohibit passage of those particles of matter introduced to within the float chamber 3 with the fuel which are of a size that might clog the jets 14, 16 of the carburetor 1 or the passages leading thereto. These particles will be retained within the compartment 38, where they may drop to the bottom as sediment. So that the filtered fuel only is led to the jet passages 12, 13 and 15 the outlet orifice 10 is disposed in the floor of the filtered fuel compartment 39.

Upon the fuel level within the float chamber 3 falling, to allow the floats 36 to descend to valve opening position, fuel will flow through the valve housing 29, and hence from the orifice 30 to within the sediment compartment 38. Fuel flowing from the orifice 30 will fall toward the pool of fuel within the chamber 3 and strike the surface close to one side of the filter screen 44. A washing action against the screen 44 takes place to clear an area of sediment particles, that might otherwise lodge upon the screen 44 and close the fine mesh to fuel passage. The particles are dislodged and carried toward the bottom of the sediment compartment 38 by the flow of the incoming fuel.

A pictorial representation of this washing action is shown in Fig. 4. The stream of fuel 45 falls with an increasing kinetic energy toward the pool surface. Upon striking the surface the stream 45 continues to descend and washes against the side of the screen 44 with sufficient force to dislodge and brush aside particles that might otherwise lodge and come to rest upon the sloping side of the screen. This washing action retains a substantially large screen area cleansed of sediment to permit fuel to readily pass from the sediment compartment 38 to the filtered fuel compartment 39. Also, as noted, the washing action of the fuel stream 42 directs particles of matter downwardly along the screen 44 to the bottom of the sediment trap compartment 38.

It has been found desirable to orientate the orifice 30, with respect to the screen 44, in a position that the descending fuel stream 45 intersects a screen area commencing directly beneath the minimum level of the fuel within the chamber 3. In this manner the area washed is wholly beneath the fuel level to present the largest cleared screen portion possible to fuel flowing into the filtered fuel compartment 39, and the kinetic energy of the fuel stream is most advantageously employed in the washing action. The fuel stream 45 should also strike the screen 44 with an obliquity deviating substantially from the normal, so that the fuel washing against the screen does not merely pass through, but instead washes across the screen to carry away sediment particles. It is recommended that the angle of incidence be greater than thirty degrees.

Periodically it becomes necessary to clean the sediment trap compartment 38, as has also been a common and necessary practice with prior devices for the filtering of fuel. The removal of sediment may be carried out without dismantling any portion of the carburetor 1. All that need be done is to open the valve 40 by means of the finger wings 41, and permit a quantity of fuel to pass outward from the chamber 3 through the valve 40 that will carry the collected sediment therewith. After a small amount of fuel is drained in this fashion, the bulk of the sediment will have been removed, and the valve 40 may be reclosed. The fuel that has been drained may be reintroduced to the fuel tank, so that the loss is slight.

This manner of cleansing the sediment trap and readying the same for further operation may be carried out easily and readily, without need of special tools or replacement parts such as gaskets and filter screens. Cleaning may be accomplished in the field, or at the service station with equal ease. These desirable results are attributable to the employment of a filter screen that is continuously washed free of matter. The washing of the screen through the manner of this invention makes possible more efficient operation of the machinery in connection with which it is employed, and since the care required for maintenance is reduced the users are not tempted to tamper with the same in order to avoid frequent cleaning.

I claim:

1. In a carburetor having a fuel containing float chamber with a float, a fuel inlet opening into said chamber a fuel inlet valve for said chamber closed and opened in response to position of said float, and a fuel outlet the combination of a screen with an inclined area that is beneath said fuel inlet and which is beneath the fuel level maintained by said float and inlet valve, said screen extending between side wall portions of said chamber to separate the same into a sediment collecting inlet compartment and an outlet compartment whereby fuel passes from said inlet compartment to said outlet compartment by flowage through said screen, said fuel inlet opening upon said inlet compartment in a position above the fuel level such that fuel discharged from said inlet moves toward said screen at an oblique angle thereto and across said inclined area of said screen at a level beneath the surface of the fuel to wash the area free of particles in the fuel and to move such particles toward the bottom of said inlet compartment, and said fuel outlet being disposed in said outlet compartment.

2. In a carburetor having a float chamber, the combination comprising a filter screen rising upwardly within said chamber extending from one side wall area to another separating said chamber into a sediment collecting compartment and a filtered fuel compartment, said screen having a portion extending obliquely upwardly with the upper side of the oblique portion facing the sediment collecting compartment, an inlet orifice disposed above the oblique portion of said screen in a position that a free fall from said orifice will intersect said screen, a valve for said orifice to control discharge of fuel through said orifice into said float chamber including a valve stem extending into said float chamber, a float within said chamber having a valve stem engaging member extending beneath said valve stem to raise the same and to permit the same to be lowered as the float rises and falls in said chamber whereby fuel will be maintained in said chamber at a level above the point of intersection of a free fall from said orifice with said screen, and a fuel outlet leading from said filtered fuel compartment.

3. In a sediment collection trap for a fuel system the combination comprising a chamber for a fluid; an inclined filter screen of fine mesh dividing the chamber into a sediment collecting compartment and an outlet compartment wherein the upper side of the inclined screen faces toward the sediment collecting compartment; an outlet in the outlet compartment for conducting filtered fluid from the chamber; fluid level regulating means adapted to regulate the level of fluid within the chamber and to establish a maximum fluid level; an inlet orifice in said sediment collecting compartment disposed above maximum fluid level facing downwardly over the inclined upper side of the screen whereby fluid discharged from the orifice plunges vertically downward in a free fall against a confined area of the screen immediately beneath maximum fluid level with a substantial velocity to wash obliquely across the screen and clear it of sediment and to carry sediment downwardly toward the bottom of the sediment collecting chamber; and valve means for the inlet orifice opened and closed in response to said fluid level regulating means.

References Cited in the file of this patent
UNITED STATES PATENTS

| | | |
|---|---|---|
| 549,390 | Patterson et al. | Nov. 5, 1895 |
| 734,812 | Bush | July 28, 1903 |
| 802,922 | Evans | Oct. 24, 1905 |
| 821,081 | Brennan | May 22, 1906 |
| 973,756 | Carter | Oct. 25, 1910 |
| 1,059,368 | Johnson | Apr. 22, 1913 |
| 1,177,174 | Doty | Mar. 28, 1916 |
| 1,370,425 | Garber | Mar. 1, 1921 |
| 1,412,487 | Peterson | Apr. 11, 1922 |
| 1,424,197 | Gebhard | Aug. 1, 1922 |
| 1,456,883 | Deeks | May 29, 1923 |
| 1,653,204 | Dahlin | Dec. 20, 1927 |
| 2,755,933 | Profit | July 24, 1956 |